US012616304B2

(12) United States Patent
Crawford et al.

(10) Patent No.: US 12,616,304 B2
(45) Date of Patent: May 5, 2026

(54) SEAT MOUNTING CLIP SYSTEM

(71) Applicant: Indiana Mills & Manufacturing, Inc., Westfield, IN (US)

(72) Inventors: Kegan Mckinney Crawford, Noblesville, IN (US); Jonathan Austin DuBois, Cicero, IN (US); Robert A. Kester, Jr., Carmel, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 276 days.

(21) Appl. No.: 18/455,936

(22) Filed: Aug. 25, 2023

(65) Prior Publication Data

US 2023/0397730 A1 Dec. 14, 2023

Related U.S. Application Data

(63) Continuation of application No. PCT/US2022/071837, filed on Apr. 21, 2022.
(Continued)

(51) Int. Cl.
*A47C 7/02* (2006.01)
*A47C 31/02* (2006.01)
(Continued)

(52) U.S. Cl.
CPC .......... *A47C 7/0213* (2018.08); *A47C 31/023* (2013.01); *B60N 2/68* (2013.01);
(Continued)

(58) Field of Classification Search
CPC ..... A47C 7/0213; A47C 7/021; A47C 31/023; F16B 5/0692; F16B 21/02; F16B 21/06;
(Continued)

(56) References Cited

U.S. PATENT DOCUMENTS 4,527,760 A * 7/1985 Salacuse ................. F16B 21/02
248/108
5,826,312 A 10/1998 Schroder et al.
(Continued)

FOREIGN PATENT DOCUMENTS

JP 2021032412 A 3/2021

OTHER PUBLICATIONS

WO, Int. App. No. PCT/US2022/071387 International Search Report, 3 pages, Aug. 8, 2022.
(Continued)

*Primary Examiner* — Syed A Islam
(74) *Attorney, Agent, or Firm* — Woodard, Emhardt, Henry, Reeves & Wagner, LLP

(57) ABSTRACT

A seat assembly including a frame and a seat mounted to the frame via one or more clips. In one example, the clips include a lock assembly configured to extend through an opening in a seat support. The lock assembly includes a T-lock with one or more tabs configured to lock the clip within the opening without the use of tools and/or other fasteners. In another example, the lock assembly is inserted into the opening and the clip is rotated 90 degrees from an unlocked to a locked position. In yet another example, the clip includes a retention assembly with a snap button configured to snap-fit within an aperture to prevent accidental rotation and/or removal of the clip from the opening.

15 Claims, 18 Drawing Sheets

Related U.S. Application Data

(60) Provisional application No. 63/201,264, filed on Apr. 21, 2021.

(51) Int. Cl.

| | |
|---|---|
| *B60N 2/68* | (2006.01) |
| *B60R 13/02* | (2006.01) |
| *F16B 5/06* | (2006.01) |
| *F16B 21/02* | (2006.01) |

(52) U.S. Cl.
CPC ......... *B60R 13/0206* (2013.01); *F16B 5/0692* (2013.01); *F16B 21/02* (2013.01)

(58) Field of Classification Search
CPC ..... F16B 21/071; B60R 13/0206; B60N 2/68; B60N 2/682; B60N 2/5825; B60N 2/6027
See application file for complete search history.

(56) References Cited

U.S. PATENT DOCUMENTS

| | | | | |
|---|---|---|---|---|
| 7,607,622 | B2 * | 10/2009 | Carnevali | .............. F16B 47/00 |
| | | | | 248/205.8 |
| 9,744,880 | B2 * | 8/2017 | Jamieson | ............. B60N 2/7094 |
| 11,332,056 | B2 | 5/2022 | Eldridge et al. | |
| 2001/0048239 | A1 | 12/2001 | Kogure | |
| 2006/0110235 | A1 * | 5/2006 | Dembowsky | ........ F16B 5/0685 |
| | | | | 411/349 |
| 2018/0304782 | A1 | 10/2018 | Yoshino et al. | |
| 2018/0340563 | A1 | 11/2018 | Line et al. | |

OTHER PUBLICATIONS

WO, Int. App. No. PCT/US2022/071387 Written Opinion, 7 pages, Aug. 8, 2022.

* cited by examiner

SEAT MOUNTING CLIP SYSTEM

CROSS REFERENCE TO RELATED APPLICATIONS

This application is a continuation of International Patent Application Number PCT/US2022/071837, filed Apr. 21, 2022, which is hereby incorporated by reference. International Patent Application Number PCT/US2022/071837, filed Apr. 21, 2022, claims the benefit of U.S. Patent Application No. 63/201,264, filed Apr. 21, 2021, which are hereby incorporated by reference.

BACKGROUND

Most vehicles have seats where passengers typically sit as the vehicle moves. In addition to comfort, the seats are generally designed to help protect the safety of passengers. As compared to consumer passenger vehicles, commercial grade passenger vehicles, like buses and vans, require a larger number of seats to accommodate passengers. As a result of the large number of seats required, installing and/or retrofitting seats in commercial grade vehicles can be a time consuming and expensive process.

Thus, there is a need for improvement in this field.

SUMMARY

Installing and/or retrofitting seats into commercial grade passenger vehicles, such as school buses, can be a laborious and time-consuming process. For example, it was discovered that securing a seat cushion base of the seat to a frame that is mounted to the floor of the vehicle can be difficult. In school buses for example, conventional P-clips or P-clamps are commonly used to secure the seat cushion base to the frame. Conventional P-clips are commonly in the form of a strap or band with a loop that is bent to give the P-clip an overall shape similar to the letter "P". The ends of the strap forming the P-clip have fastener openings to which a screw or other fastener is secured.

When securing seat cushion bases on school buses and other vehicles, the P-clip is wrapped around the frame such that the frame is received in the closed loop of the P-clip. Typically, two or more P-clips are required to secure an individual seat base to the frame. Seat cushion bases typically include seat cushion foam that is supported by a cushion support structure such as in the form of a plywood or fiberwood board. The cushion foam is usually covered by a cover made from fabric or water proof material such as vinyl. To secure the seat cushion base to the frame, the fastener openings of the multiple P-clips are aligned so as to receive wood screws which are then screwed into the plywood forming the support structure. As should be recognized, multiple assembly workers may be required to properly hold and align the seat base, P-clips, and frame during mounting to the frame. Safety issues can also arise if the seat base is not properly secured to the frame. If great care is not taken when installing the seat base, the screws and P-clips may not be properly secured. For instance, the screws or the wood forming the cushion support structure can be stripped or broken. Screws may be dropped or lost, and similarly, the screwdrivers used to drive the screws may be dropped or lost as well. Moreover, the locations where the P-clips are secured to the plywood board can be inconsistent between seats.

A unique vehicle seat mounting system and assembly technique have been developed to address these as well as other issues. Through this vehicle seat mounting system, a single assembly worker may be able to mount the seat base to the frame without the need of tools, additional fasteners, and/or even outside assistance. The system includes clips that are able to be secured to the cushion support structure manually without the need of tools. In one form, the clips are inserted into openings in the support structure and secured to the seat cushion base by rotating the clip by a quarter turn.

In one example, the cushion support structure is in the form of a plywood or fiberwood board, and the clips are made from plastic that is injection molded to form the overall shape of the clip. In one version, a computer numerical control (CNC) machine is used to cut openings in the plywood board forming the cushion support structure where the clips are secured, but these openings can be formed in other manners. By having the openings in the support structure, the location of the clips can be kept consistent. The openings are shaped such that the clips can only be installed in one orientation which helps to simplify assembly. The clips have lugs that are inserted into the openings, and once the clip is turned, the lugs lock the clip to the cushion support structure. The clip and opening form a stop structure that prevent over-rotation of the clip, and the clip includes a detent-type mechanism that engages the seat cushion support structure to prevent the clip from rotating back and releasing from the opening in the support structure. The detent mechanism in one example is in the form of a lock or snap button on a pre-loaded member that is biased to engage the lock button into an alignment aperture in the seat cushion support structure.

In contrast to conventional P-clips where the strap forms a closed loop, the clip has an open design such that the clip can be readily snapped onto the frame. The clip includes a clamp or jaw that is hooked-shaped to define a clamp or jaw opening. Once the clips are secured to the seat cushion base, an assembly worker aligns the jaw openings with a crossbar of the frame. The worker then pushes the seat cushion base towards the crossbar of the frame. The jaws of the clips are designed to be flexible and resilient. As the seat cushion base is pushed, the jaws deflect so as to further widen the jaw openings. As the crossbar is received inside the jaws, the jaws spring back so as to retain the crossbar inside the clips. With this construction, the entire seat cushion base is secured to the crossbar of the frame via a single movement. The seat cushion base is then pivoted relative to the crossbar and latched in place via a latch plate on the seat cushion base.

In one particular version, the seat mounting system or assembly includes the clips configured to secure the seat to the frame without the use of tools and/or fasteners. In one example, the clips include a locking assembly configured to mount within an opening defined by a seat support without the use of fasteners and/or tools. In another example, the clips include a retention assembly configured to prevent accidental removal of the clips from the seat support. In yet another example, the clips include a clamp assembly configured to secure the clip to the frame via a clamping force.

The clips include a body extending into the clamp assembly, the retention assembly, and the locking assembly. The clamp assembly defines the jaw configured to retain and secure the crossbar of the seat frame. The jaw generates a clamping force on the crossbar such that the seat is retained on the seat frame. As should be appreciated, the jaw is configured to retain the crossbar in such a manner that the seat is rotatable about an axis formed by the crossbar. Thus, a user can rotate the seat upwards to access an area under the seat. The retention assembly includes a snap button configured to snap-fit within an aperture of the seat support. The snap button is configured to prevent accidental rotation and/or removal of the clip from the seat support via the snap-fit connection. The retention assembly is further configured to enable the clips to work with various thickness seat supports. For example, the retention assembly is configured to flex and/or adjust based on a thickness of the seat support.

The locking assembly includes a bearing extending into a T-lock configured to extend through the opening in the seat support and secure the clip to the seat. The T-lock further includes one or more tabs configured to interact with an interior side of the seat support to lock the clip into position. The opening in the seat support defines one or more notches and a protrusion. The notches are configured to enable passage of the tabs through a sidewall of the seat support. However, once the body of the clip contacts the seat support surface, the clip is rotated 90 degrees. Rotation of the clip causes the tabs to come out of alignment with the notches and lock into position on the inner side of the seat support. Put differently, the clip is rotatable from an unlocked position where the tabs are aligned with the notches to a locked position where the tabs are locked via contact with the interior side of the seat support.

To prevent improper insertion of the clip into the opening, the clip includes a pair of lugs defining a recessed portion of the bearing. The lugs enable a user to align the clip within the opening. For example, the user aligns the recessed portion with the protrusion of the opening and the tabs with the notches of the opening in the unlocked position. The clip slots into the opening and a user rotates the clip clockwise until the protrusion abuts the lugs in the locked position. At this time, the snap button is configured to snap-fit into the aperture to prevent accidental rotation and/or removal of the clip from the opening. The snap button is further configured as a vibration dampening features to prevent and/or reduce movement of the clip, which may cause unwanted noise and/or seat vibration. In one example, the clip is rotated less than 180 degrees. In another example, the clip is rotated more than 180 degrees. In yet another example, the clip is rotated counterclockwise. In another embodiment, the clip is rotated clockwise 90 degrees.

As should be appreciated, the clip is configured to disperse force applied to the clamp portion through the seat support via the tabs. For example, downward force applied to the clamp portion results in a downward force applied to the inner surface of the seat support via the tabs. Thus, the seat assembly is able to withstand high force values without failure due to the strength of the seat support.

The clip facilitates toolless mounting and removal of the clip from the seat. Furthermore, the clip facilitates toolless mounting and removal of the seat from the seat frame. This configuration prevents unwanted failures from the use of tools and/or fasteners. In one example, the clip is made of plastic, such as injection molded plastic. In another example, the clip is made of metal.

The system and techniques as described and illustrated herein concern a number of unique and inventive aspects. Some, but by no means all, of these unique aspects are summarized below.

Aspect 1 generally concerns a system that includes a system.

Aspect 2 generally concerns the system of any previous aspect in which the seat component.

Aspect 3 generally concerns the system of any previous aspect in which the clip.

Aspect 4 generally concerns the system of any previous aspect in which the clip manually coupled to the seat component without fasteners.

Aspect 5 generally concerns the system of any previous aspect in which the seat component includes a seat support.

Aspect 6 generally concerns the system of any previous aspect in which the seat support defines an opening.

Aspect 7 generally concerns the system of any previous aspect in which the clip is configured to lock in the opening of the seat support via a rotational movement.

Aspect 8 generally concerns the system of any previous aspect in which the clip has one or more lugs configured to lock to the seat support via the opening.

Aspect 9 generally concerns the system of any previous aspect in which the opening is shaped to allow the lugs of the clip to be inserted into the opening at a single orientation.

Aspect 10 generally concerns the system of any previous aspect in which the seat support defines one or more notches configured to receive the lugs of the clip.

Aspect 11 generally concerns the system of any previous aspect in which the clip has a grab fin to facilitate rotation of the clip.

Aspect 12 generally concerns the system of any previous aspect in which the clip includes a detent to inhibit rotational movement of the clip.

Aspect 13 generally concerns the system of any previous aspect in which the seat support defines an aperture where the detent of the clip engages to inhibit the rotational movement of the clip.

Aspect 14 generally concerns the system of any previous aspect in which the detent includes a tongue with a button engaging the aperture in the seat support.

Aspect 15 generally concerns the system of any previous aspect in which the clip has a jaw.

Aspect 16 generally concerns the system of any previous aspect in which the grab fin extending from the jaw.

Aspect 17 generally concerns the system of any previous aspect in which the jaw defines a jaw opening.

Aspect 18 generally concerns the system of any previous aspect in which the jaw is configured to clip to the frame.

Aspect 19 generally concerns the system of any previous aspect in which the jaw is resilient to bend as the frame is inserted through the jaw opening of the clip.

Aspect 20 generally concerns the system of any previous aspect in which the seat assembly.

Aspect 21 generally concerns the system of any previous aspect in which the seat assembly includes a frame and a seat mounted to the frame.

Aspect 22 generally concerns the system of any previous aspect in which the frame.

Aspect 23 generally concerns the system of any previous aspect in which the frame includes a crossbar.

Aspect 24 generally concerns the system of any previous aspect in which the clips secure the seat to the frame via a clamping force on the crossbar.

Aspect 25 generally concerns the system of any previous aspect in which the clamping force is applied via a clamping assembly of the clip.

Aspect 26 generally concerns the system of any previous aspect in which the seat mounts to the frame via one or more clips.

Aspect 27 generally concerns the system of any previous aspect in which the clips are configured to mount the seat to the frame without the use of tools and/or fasteners.

Aspect 28 generally concerns the system of any previous aspect in which the seat includes a cushion and a seat support configured to support the cushion.

Aspect 29 generally concerns the system of any previous aspect in which the clips are configured to mount within the seat support without the use of tools and/or fasteners.

Aspect 30 generally concerns the system of any previous aspect in which the clips are secured within an opening defined by the seat support via 90 degree rotation of the clip.

Aspect 31 generally concerns the system of any previous aspect in which the opening defines one or more notches and a protrusion.

Aspect 32 generally concerns the system of any previous aspect in which the clip includes a retention portion configured to prevent accidental rotation and/or removal of the clip from the seat support.

Aspect 33 generally concerns the system of any previous aspect in which the retention portion defines a snap button configured to snap-fit within an aperture located on the seat support.

Aspect 34 generally concerns the system of any previous aspect in which the clip is rotatable from an unlocked position to a locked position.

Aspect 35 generally concerns the system of any previous aspect in which the snap button is configured to snap-fit within the aperture when the clip is in the locked position.

Aspect 36 generally concerns the system of any previous aspect in which the tabs of the T-lock are aligned with one or more notches in the unlocked position.

Aspect 37 generally concerns the system of any previous aspect in which the tabs of the T-lock are unaligned with the notches in the locked position.

Aspect 38 generally concerns the system of any previous aspect in which the clip is moved from the unlocked position to the locked position via 90 degree rotation of the clip.

Aspect 39 generally concerns the system of any previous aspect in which the clip includes a lock assembly including a bearing and a T-lock.

Aspect 40 generally concerns the system of any previous aspect in which the T-lock includes one or more tabs.

Aspect 41 generally concerns the system of any previous aspect in which the lock assembly is configured to pass through a sidewall of the opening into an interior of the seat.

Aspect 42 generally concerns the system of any previous aspect in which the seat connected to the frame via one or more clips.

Aspect 42 generally concerns the system of any previous aspect in which the T-lock is configured to disperse force applied to the clip into the seat support.

Aspect 43 generally concerns the system of any previous aspect in which the clip secures the seat component to the frame.

Aspect 44 generally concerns the system of any previous aspect in which the body.

Aspect 45 generally concerns the system of any previous aspect in which the jaw extending from the body.

Aspect 46 generally concerns the system of any previous aspect in which the jaw is hook-shaped.

Aspect 47 generally concerns the system of any previous aspect in which the lugs extending from the body.

Aspect 48 generally concerns the system of any previous aspect in which the lugs are configured to lock to a seat component.

Aspect 49 generally concerns the system of any previous aspect in which the lugs are positioned to allow the clip to be installed in a single orientation.

Aspect 50 generally concerns the system of any previous aspect in which the detent includes a tongue with a button.

Aspect 51 generally concerns the system of any previous aspect in which the jaw is clipped to the frame.

Aspect 52 generally concerns a system that includes a method.

Aspect 53 generally concerns the system of any previous aspect in which the inserting one or more lugs of a clip into an opening of a seat support structure.

Aspect 54 generally concerns the system of any previous aspect in which the rotating the clip to lock the lugs to the seat support structure.

Aspect 55 generally concerns the system of any previous aspect in which the clipping the seat support structure to a frame by inserting the frame through the jaw opening of the clip.

Aspect 56 generally concerns the system of any previous aspect in which the inserting includes orienting the lugs to an orientation corresponding to one or more notches around the opening of the seat support structure.

Aspect 57 generally concerns the system of any previous aspect in which the retaining the clip at a locked position by engaging a retention assembly of the clip with the seat support structure.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
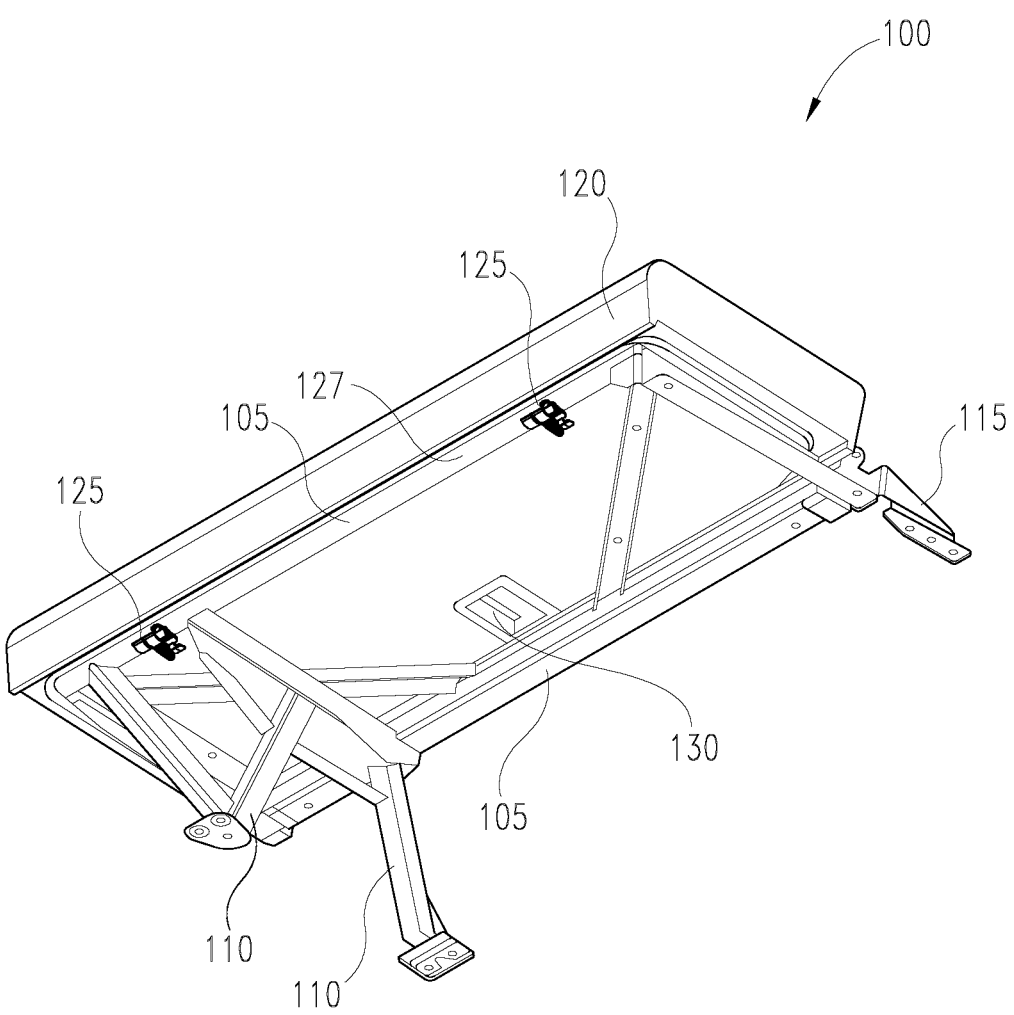
FIG. 1 is a bottom perspective view of a seat assembly.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 2:
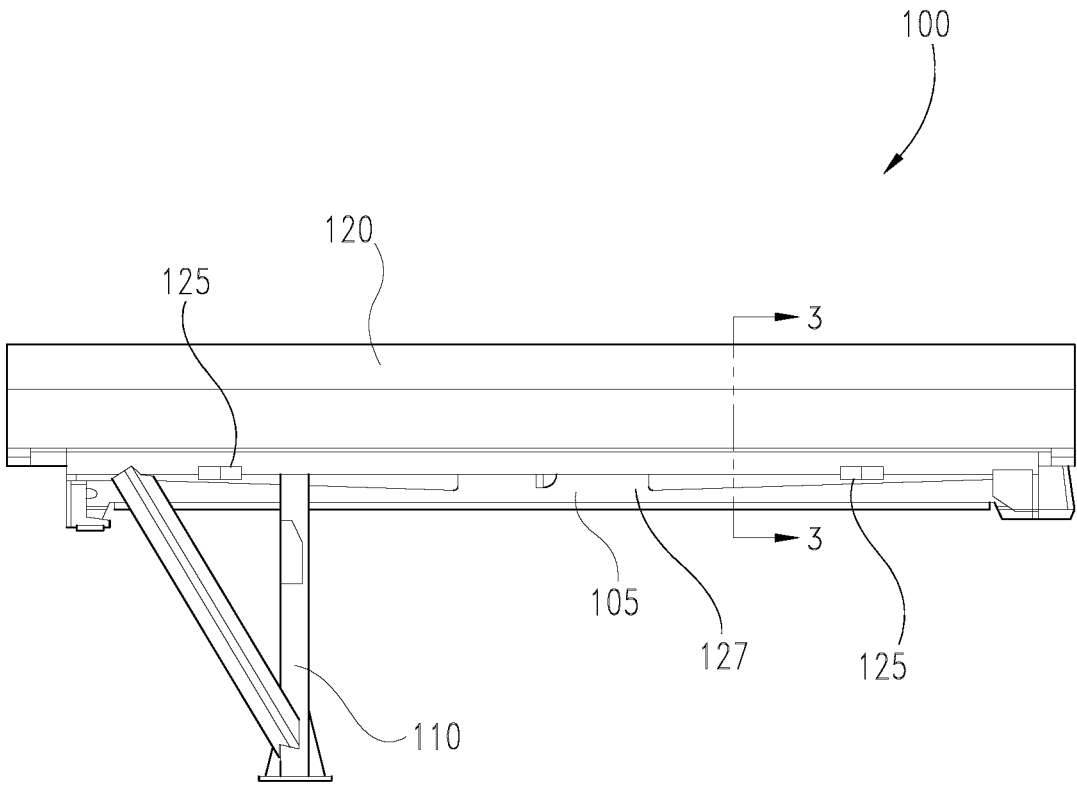
FIG. 2 is a front view of the seat assembly of FIG. 1.
Figure 3:
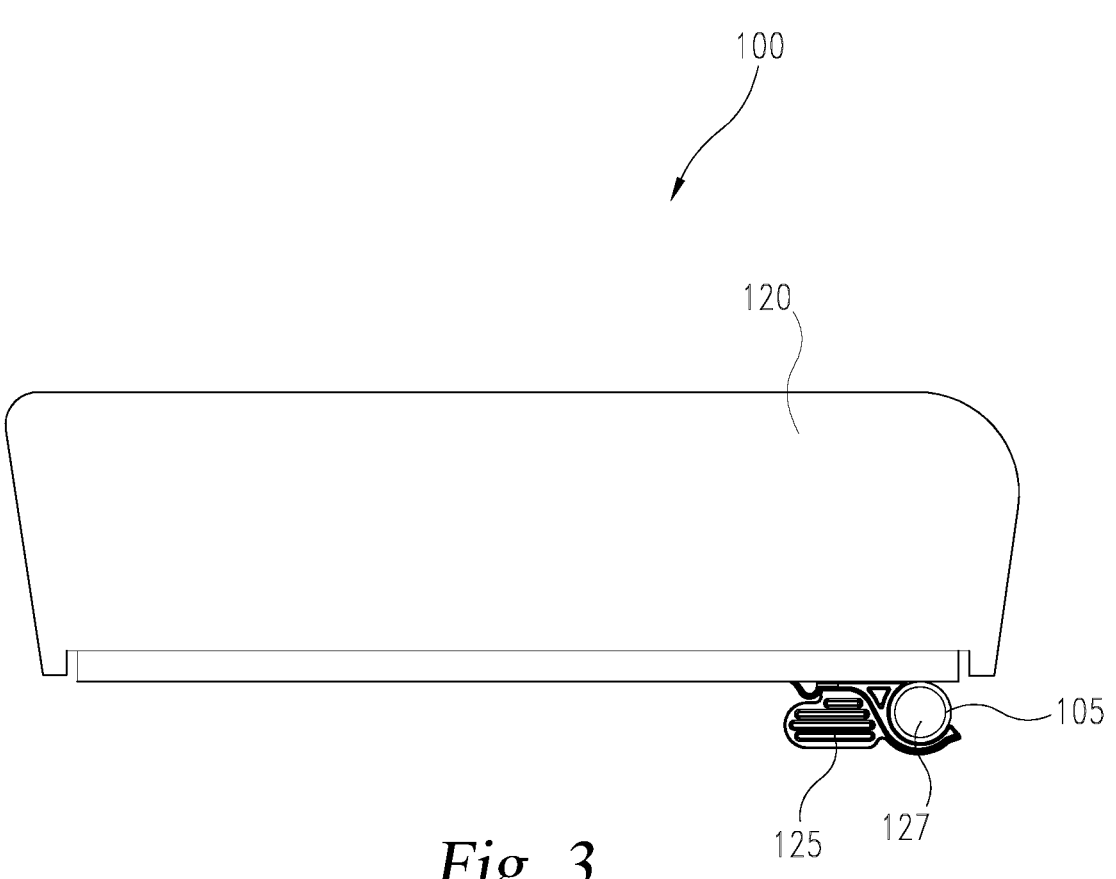
FIG. 3 is a cross-sectional view of the seat assembly as taken along line 3-3 in FIG. 2.

FIGS. 1, 2, and 3 show examples of a seat assembly 100. The seat assembly 100 includes a frame 105 configured to support a seat 120. In one example, the frame 105 includes one or more legs 110 and a mounting bracket 115. The legs 110 are configured to secure the seat assembly 100 to a floor of a vehicle. The mounting bracket 115 is configured to secure the seat assembly 100 to a sidewall and/or other mounting location within a vehicle. In another example, the seat assembly 100 includes a frame 105 with only legs 110 and no mounting bracket 115. In yet another example, the seat assembly 100 includes a frame 105 with only mounting brackets 115 and no legs 110. The frame 105 is typically made from high-strength materials to resist impact forces in the event of an accident. For example, the frame 105 is made from metal, stainless steel, plastic, polymeric material, metallic material, and/or other materials. The legs 110 and/or the mounting brackets 115 are secured to the vehicle via one or more fasteners. For example, the legs 110 and/or the mounting brackets 115 are secured via screws, bolts, nuts, rivets, adhesive, welds, nails, and/or other fasteners.

The seat 120 is secured to the frame 105 via one or more clips 125. The clips 125 are configured to clamp and/or latch around a crossbar 127 of the frame 105 to retain the seat 120 to the frame 105. As should be appreciated, the clamping force exerted on the crossbar 127 via the clips 125 enables rotational movement of the seat 120 about the crossbar 127. Thus, the seat 120 may be rotated upwards to access storage and/or an underside of the seat 120 as needed. In other examples, the clips 125 are configured to clamp around the crossbar 127 such that the seat 120 is mountable and/or removable from the frame 105 without the use of tools and/or other equipment.

The seat 120 further includes a latch plate 130 configured to assist a user in securing the seat 120 to the frame 105. As should be appreciated, the seat 120 and/or frame 105 may be different shapes and/or configurations depending on the intended usage. In one example, the seat 120 and/or frame 105 are rectangular, polygonal, circular, oval, and/or other shapes. In other embodiments, the seat 120 is made from a combination of a foam and/or fabric inner portion and a leather, fabric, suede, nylon, and/or polyester outer covering.

Figure 4:
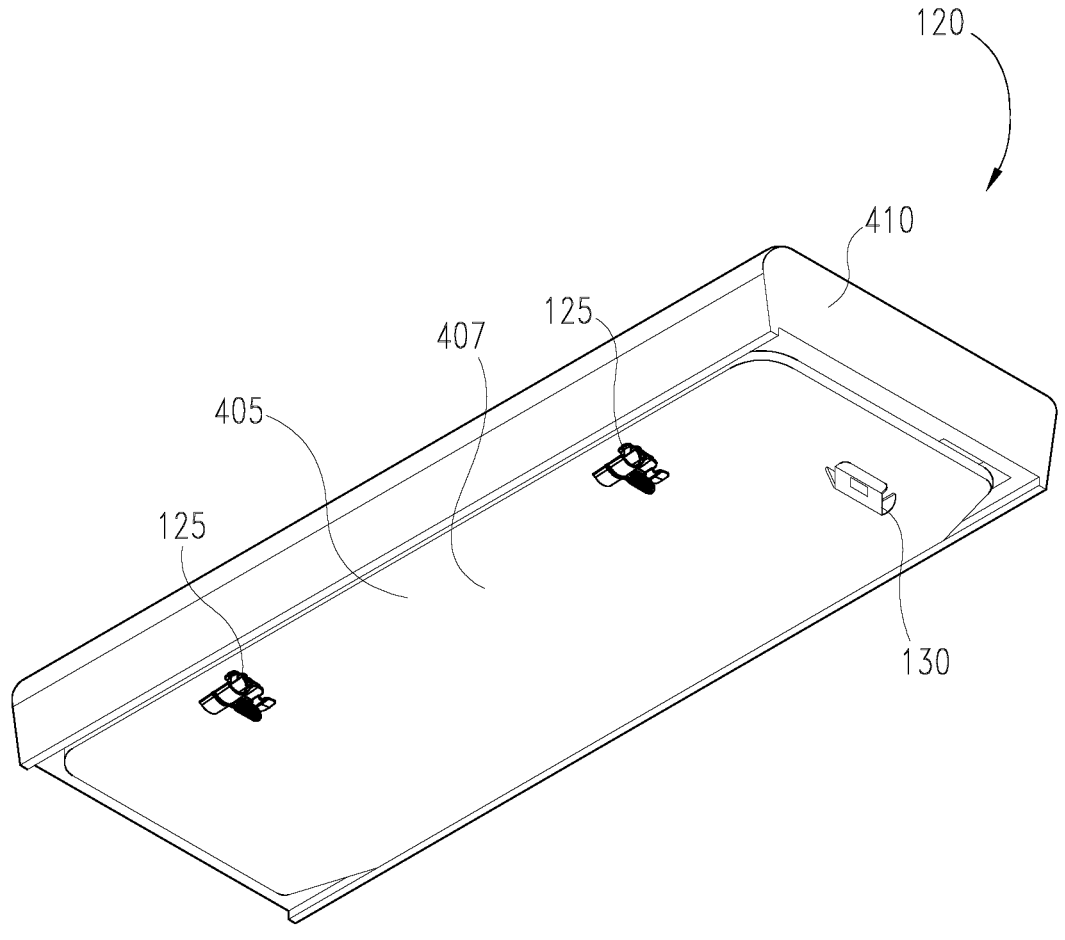
FIG. 4 is a bottom perspective view of a seat of the seat assembly of FIG. 1.

FIG. 4 shows an example of the seat 120. The seat 120 is shown to include a seat base 405 with a seat support 407 configured to support a cushion 410. The cushion 410 is configured as the seating location for a user and generally faces a user when mounted. The seat base 405 is configured to provide support and/or structure to the cushion 410 and generally faces a vehicle floor when mounted. In one example, the clips 125 are configured to secure within the seat support 407 via one or more openings 505 (shown in FIG. 5).

Figure 5:
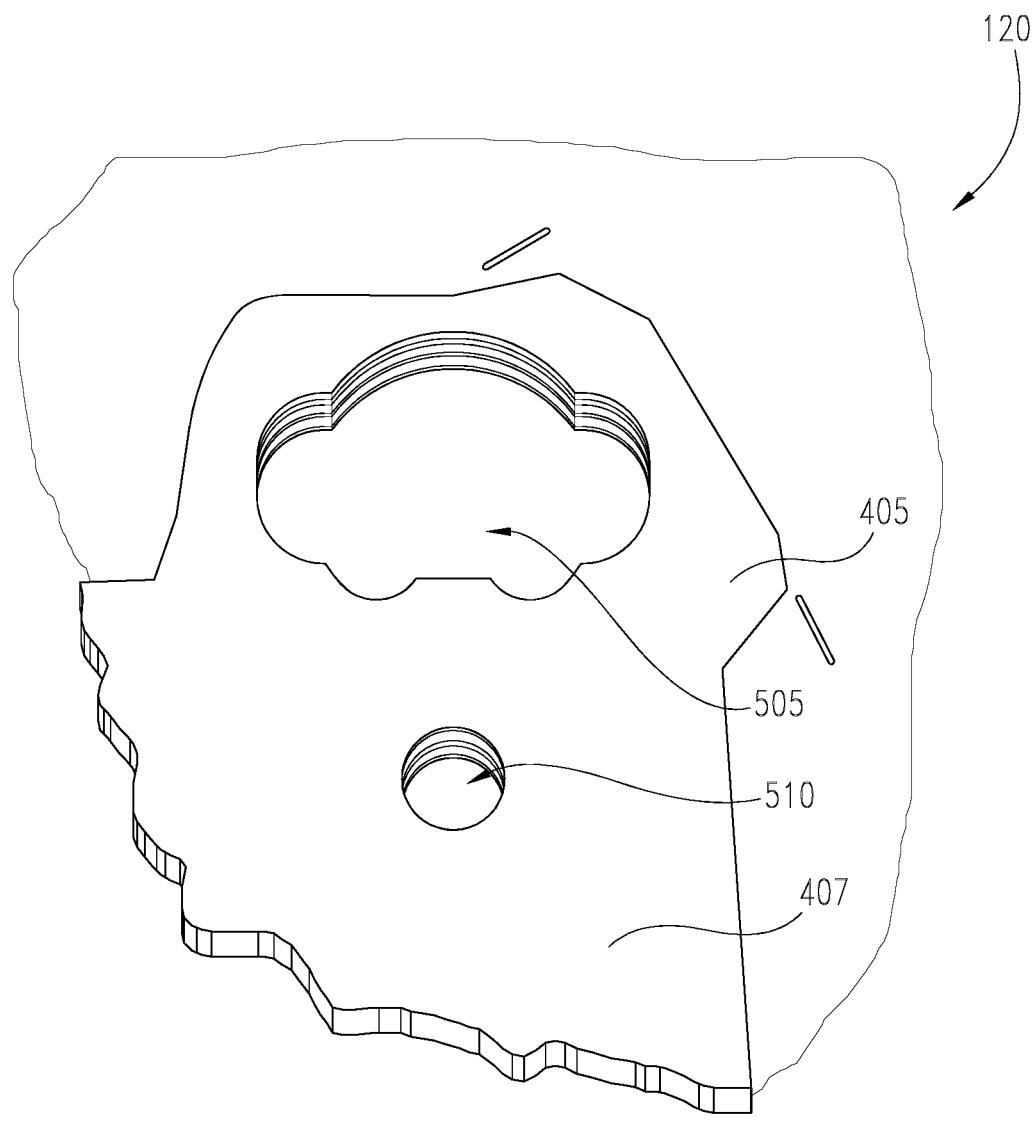
FIG. 5 is a bottom view of the seat of FIG. 4 with one or more clips removed.
Figure 6:
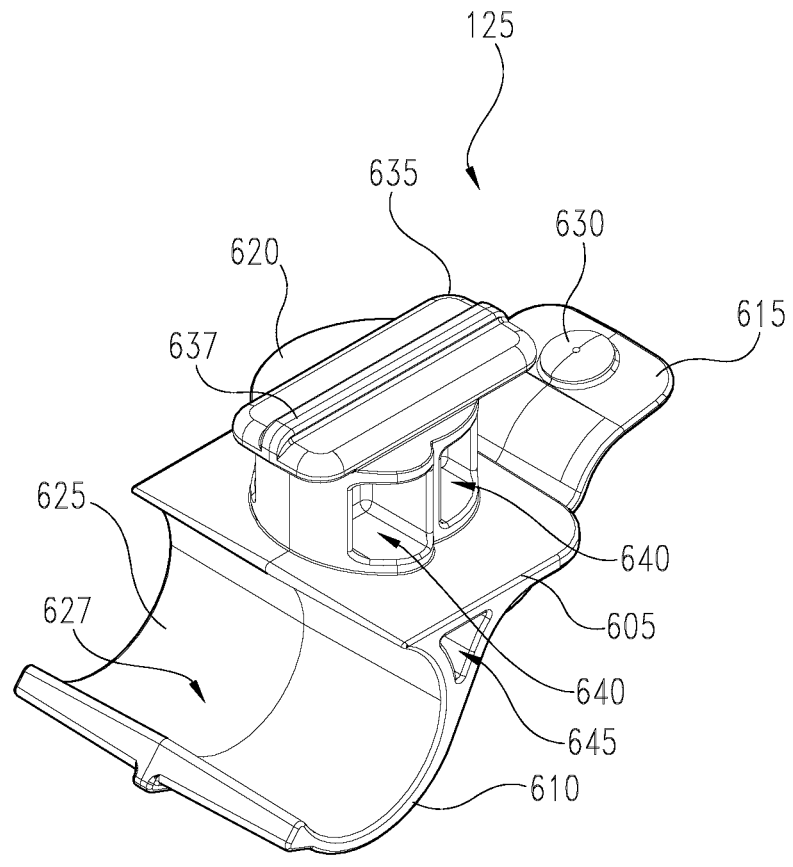
FIG. 6 is a perspective view of the clip of FIG. 1.
Figure 7:
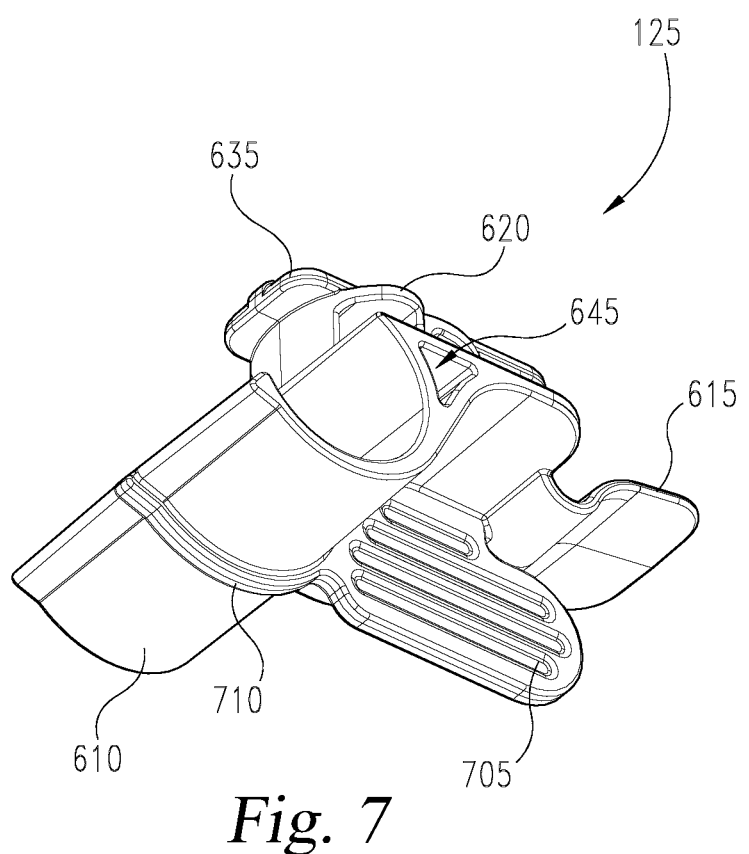
FIG. 7 is a bottom perspective view of the clip of FIG. 1.
Figure 8:
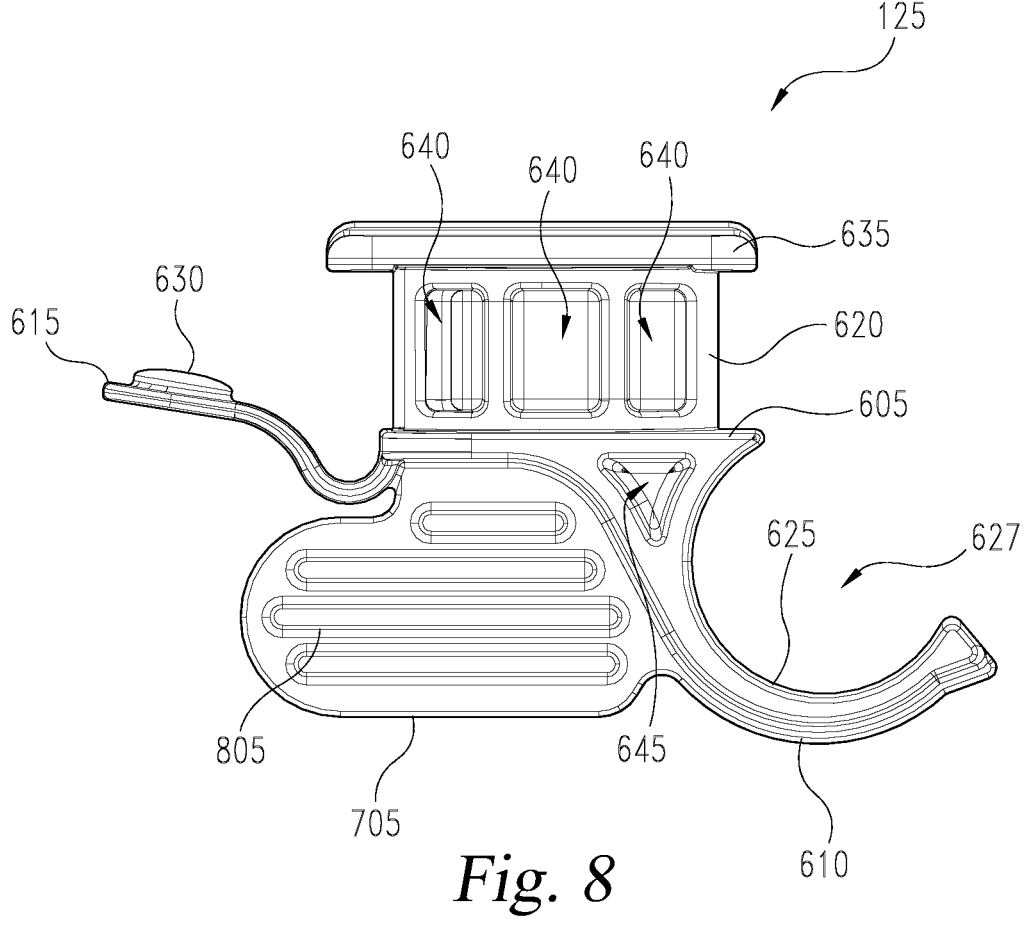
FIG. 8 is a side view of the clip of FIG. 1.
Figure 9:
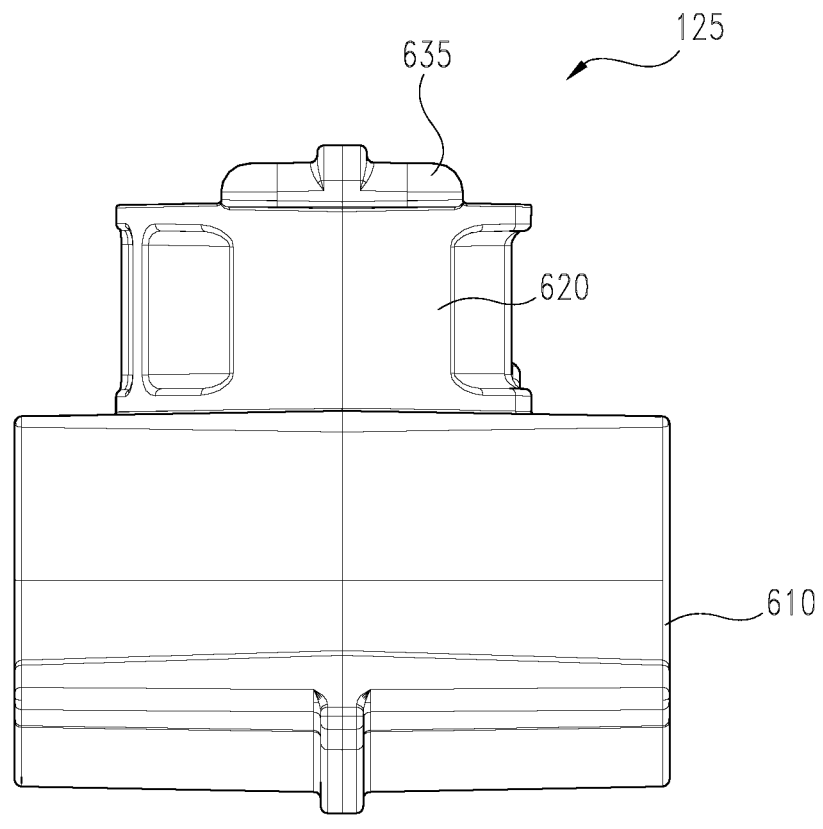
FIG. 9 is a front view of the clip of FIG. 1.
Figure 10:
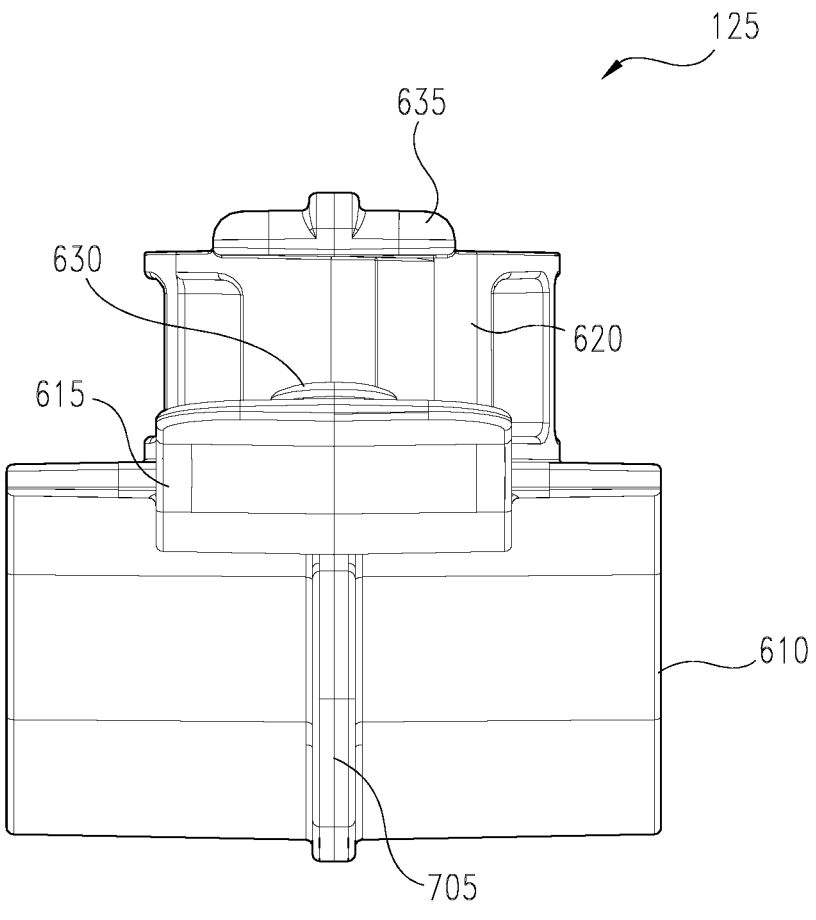
FIG. 10 is a rear view of the clip of FIG. 1.
Figure 11:
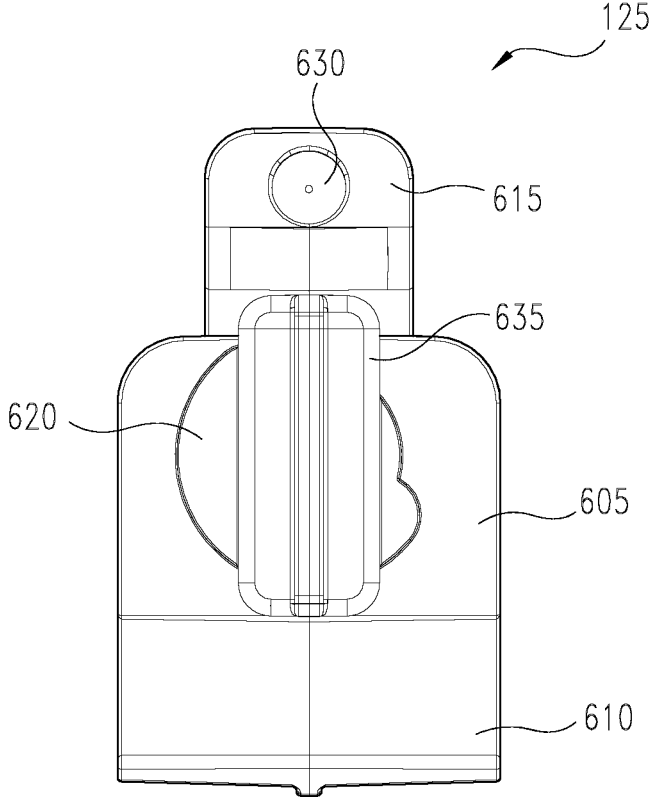
FIG. 11 is a top view of the clip of FIG. 1.
Figure 12:
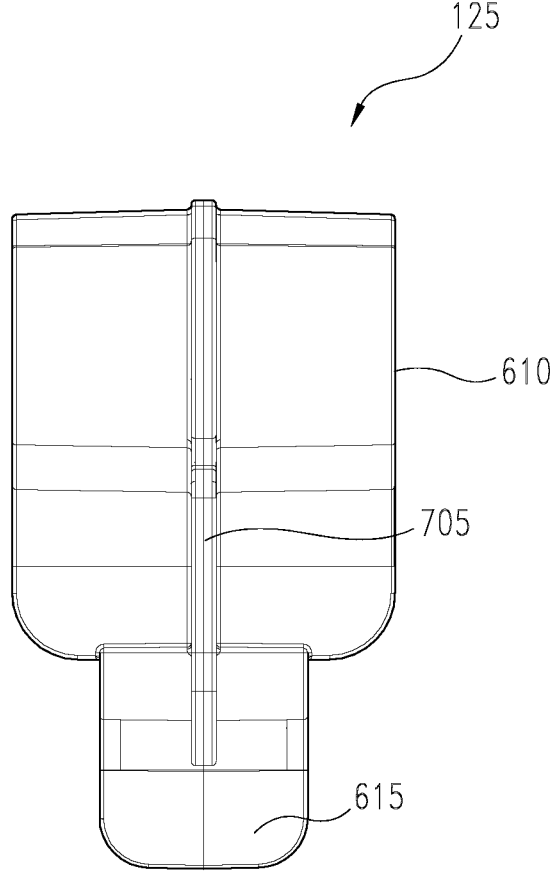
FIG. 12 is a bottom view of the clip of FIG. 1.

FIG. 5 shows an example of a portion of the seat 120 including the opening 505. The opening 505 is configured to receive one or more clips 125. For example, the clip 125 is inserted into the opening 505 such that a portion of the clip 125 extends through the seat support 407 and into an interior portion of the seat 120. The clip 125 is then rotated to lock and/or secure the clip 125 within the opening 505. To assist in locking the clip 125 within the opening 505 the seat support 407 further includes an aperture 510. The aperture 510 is configured to engage with a portion of the clip 125 to prevent accidental rotation and/or detachment of the clip 125 from the seat support 407. As should be appreciated, the interaction between the clip 125 and the opening 505 is able to be completed without the use of tools and/or other fasteners. Thus, saving time and costs on manufacturing.

FIGS. 6, 7, 8, 9, 10, 11, and 12 show various views of the clip 125. The clip 125 includes a body 605 with a clamp assembly 610 and a retention assembly 615 extending from opposite sides of the body 605. The clamp assembly 610 is configured to receive and/or clamp to the crossbar 127 to secure the seat 120 to the frame 105. The retention assembly 615 is configured to snap-fit within the aperture 510 of FIG. 5 to prevent accidental rotation and/or detachment of the clip 125. The body 605 is further includes a bearing 620 extending from the body 605 and configured to interact with the opening 505 of FIG. 5 to mount the clip 125 to the seat 120.

The clamp assembly 610 defines a jaw 625 with a jaw opening 627 configured to receive the crossbar 127 and generate a clamping force on the crossbar 127 between the clamp assembly 610 and the seat support 407. In the illustrated example, the jaw 625 is hook-shaped to receive the crossbar 127. In one form, the crossbar 127 has a cylindrical shape, and the interior of the jaw 625 has a corresponding cylindrical shape. The jaw 625 is flexible and/or resilient such that when the crossbar 127 is received in the jaw opening 627, the clamp assembly 610 bends and springs back to claim the crossbar 127 inside the clamp assembly 610.

The retention assembly 615 acts like a detent mechanism to rotationally align and hold the clip 125 in place. In one form, the retention assembly 615 includes a snap button 630 configured to snap into the aperture 510 to prevent accidental rotation and/or detachment of the clip 125. The bearing 620 includes a T-lock 635 configured to extend through the opening 505 and engage with an inner side of the seat support 407 to lock and/or secure the clip 125 to the seat 120. In one example, the T-lock 635 includes a ridge 637 configured to decrease the friction and/or force required to rotate the clip 125. In another example, the ridge 637 increased rigidity and/or strength of the T-lock 635 to prevent failure of the clip 125 under high forces, such as during a vehicular accident. As should be appreciated, the T-lock 635 is configured to disperse force applied to the clip 125 evenly throughout the seat support 407. For example, force applied to the clamp assembly 610 via the crossbar 127 causes the T-lock 635 to apply a force to an inner side of the seat support 407. As should be appreciated, this configuration is able to resist large force values based on the strength of the seat support 407.

The bearing 620 further includes one or more cavities 640. The cavities 640 are configured to reduce the overall weight of the clip 125. The cavities 640 also reduce the overall material needed to manufacture the clip 125, thus reducing manufacturing costs. Located between the body 605 and the clamp assembly 610 is a channel 645. The channel 645 is configured to reduce the overall weight of the clip 125. The channel 645 also reduces the overall material needed to manufacture the clip 125, thus reducing manufacturing costs The clip 125 further includes a grip fin 705 with one or more ridges 805. The grip fin 705 serves as a handle for a user to grasp during insertion and/or removal of the clip 125. The ridges 805 are configured to increase friction and/or prevent slipping of a user when inserting and/or removing the clip 125. In one example, the grip fin 705 extends into a gusset 710 bisecting the clamp assembly 610. The gusset 710 is configured to increase the strength and/or rigidity of the clamp assembly 610. For example, the gusset 710 assists the clamp assembly 610 in maintaining sufficient clamping force on the crossbar 127. In one embodiment, the clip 125 is made from plastic and/or a polymeric material. In another embodiment, the clip 125 is made from metal and/or a metallic material.

Figure 13:
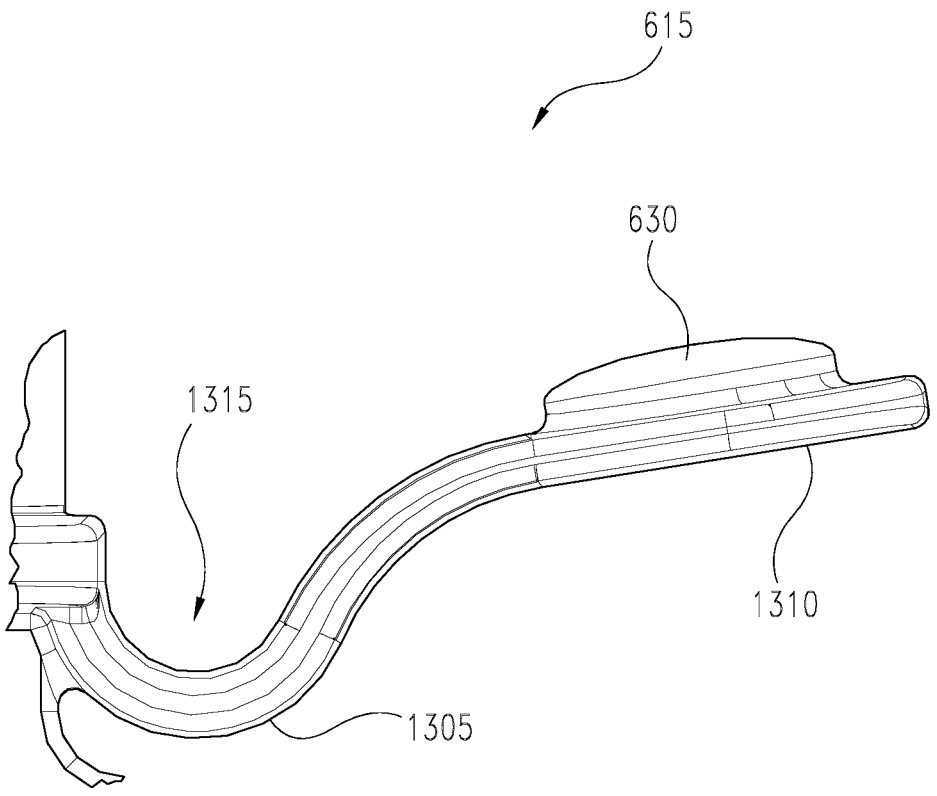
FIG. 13 is a side view of a retention assembly of the clip of FIG. 6.

As can be seen in FIG. 13, the retention assembly 615 includes an arcuate portion 1305 extending into a tongue 1310. The arcuate portion 1305 defines a flex groove 1315 configured to bias the tongue 1310 towards the seat support 407. As should be appreciated, the arcuate portion 1305 enables flexibility of the tongue 1310 and the retention assembly 615. The flexibility of the retention assembly 615 enables the retention assembly 615 to accommodate different thicknesses of the seat support 407. Additionally, the tongue 1310 is configured to bias such that the snap button 630 is configured to snap-fit within the aperture 510 to prevent accidental rotation and/or removal of the clip 125 from the opening 505.

Figure 14:
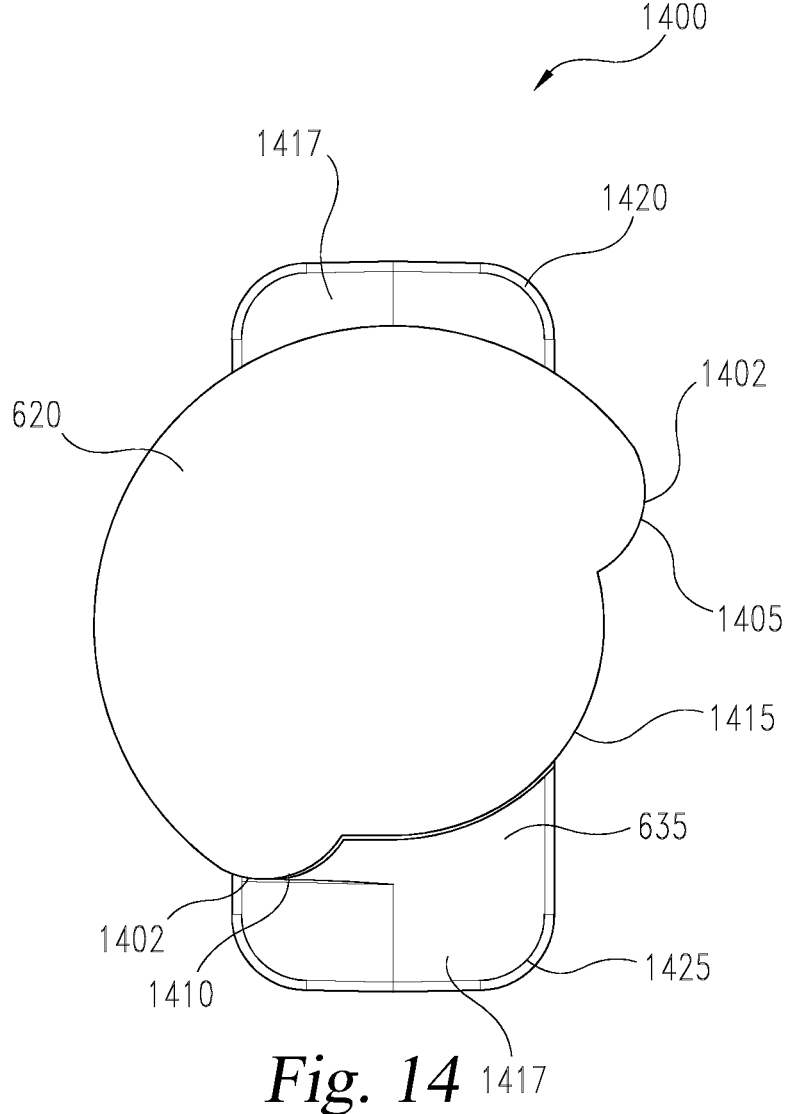
FIG. 14 is a bottom view of a lock assembly of the clip of FIG. 6.

FIG. 14 shows an example of a lock assembly 1400 including the bearing 620 and the T-lock 635. The bearing 620 includes one or more lugs 1402. For example, the bearing 620 includes a first lug 1405 and a second lug 1410. The lugs 1402 define a recessed portion 1415 configured to enable proper interconnection between the bearing 620 and the opening 505. The T-lock 635 incudes one or more tabs 1417. For example, the T-lock 635 includes a first tab 1420 and a second tab 1425. The tabs 1417 are configured to extend through the seat support 407 and rest against an interior side of the seat support 407. As has been mentioned previously, the tabs 1417 distribute force applied to the clip 125 into the seat base 405.

Figure 15:
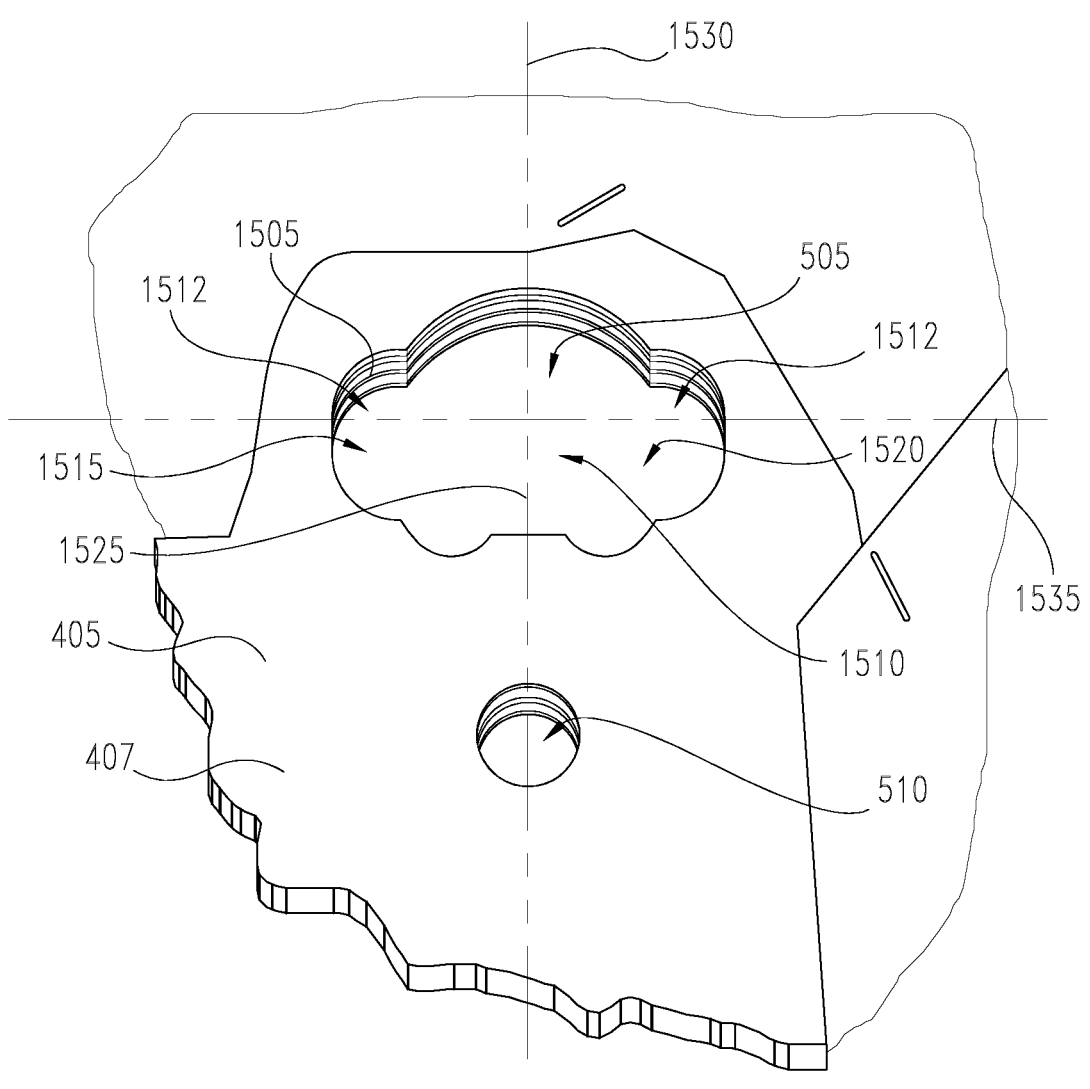
FIG. 15 is a bottom view of an opening defined by a seat support of FIG. 4.

FIG. 15 shows another view of the opening 505 including a sidewall 1505. The sidewall 1505 corresponds to the thickness of the seat support 407. The opening 505 further includes a slot 1510 with a pair of opposing notches 1512. For example, the opening 505 includes a first notch 1515 and a second notch 1520 extending opposite one another. Located between the first notch 1515 and the second notch 1520 is a protrusion 1525. The protrusion 1525 serves as a catch and/or lip configured to retain the clip 125 within the opening 505.

Figure 16:
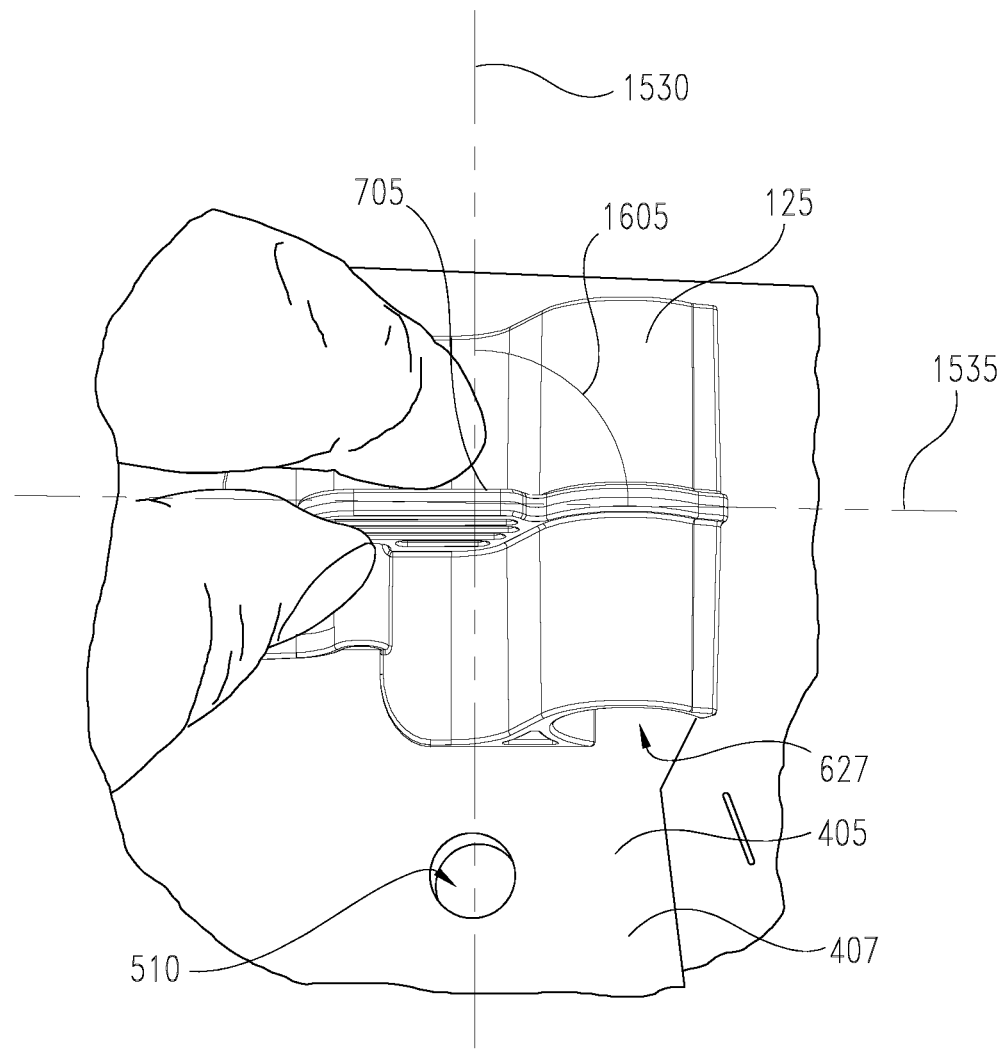
FIG. 16 is a bottom view of insertion of the clip into the opening of FIG. 15.

FIG. 16 shows an example of a user inserting the clip 125 into the opening 505. In one example, to secure the clip 125 within the opening 505. A user inserts the T-lock 635 of the clip 125 into the opening 505 such that the first tab 1420 aligns with the second notch 1520 and the second tab 1425 aligns with the first notch 1515. The clip 125 is then able to slide and/or extend through the opening 505 via the bearing 620, which extends through the opening 505 past the depth of the sidewall 1505 until the body 605 contacts the seat support 407. As can be seen in FIG. 16 the clip 125 is oriented along a X-axis 1535 during this stage of the installation. As should be appreciated, at this stage, the clip 125 is fully within the opening 505, but is not secured within the opening 505. Thus, to remove the clip 125 from the opening 505 at this stage the user simply pulls the clip 125 upwards out of the opening 505.

Figure 17:
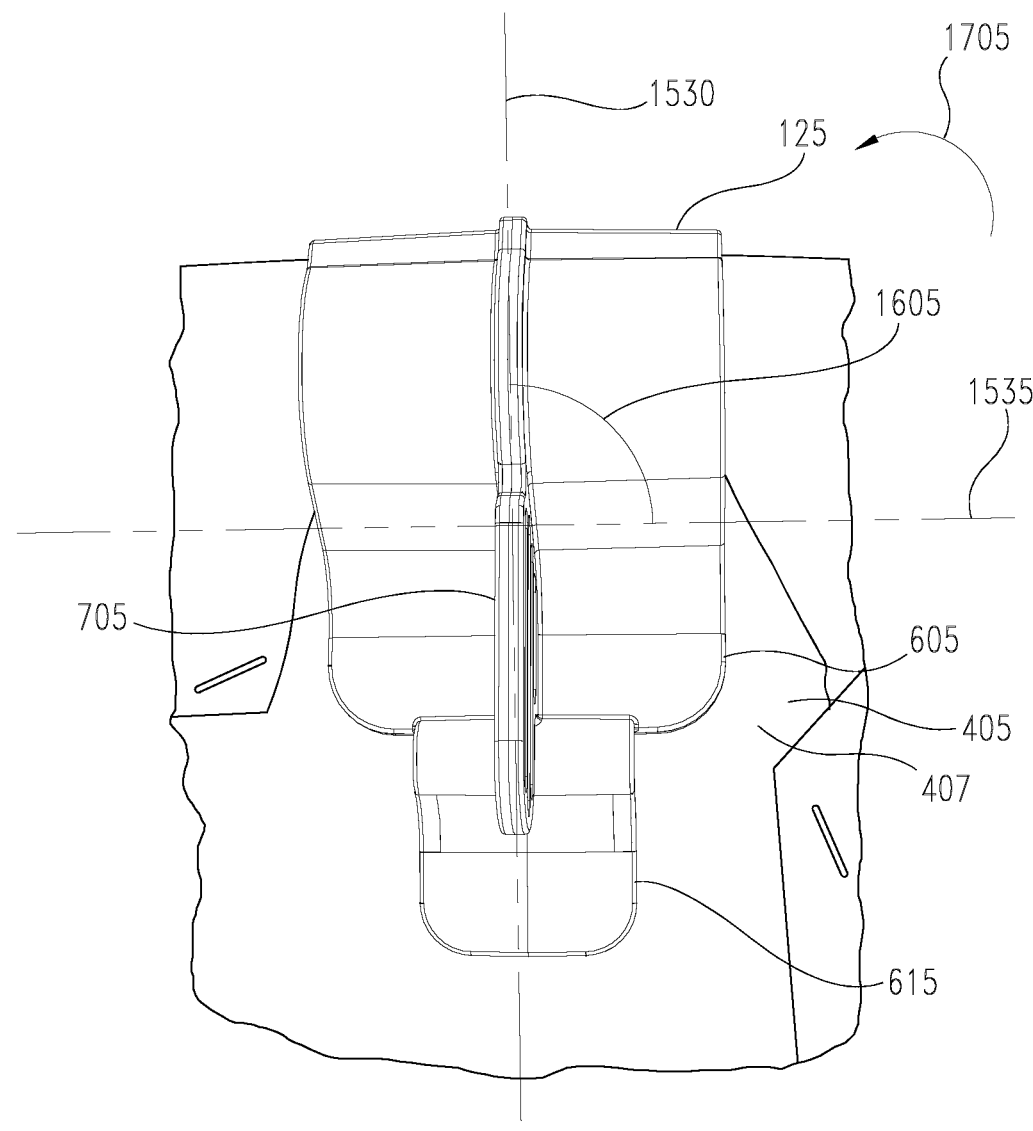
FIG. 17 is a bottom view of the opening including the inserted clip.

FIG. 17 shows an example of the clip 125 in the locked and/or secured position. To enter the locked position, the clip 125 is rotated counterclockwise as shown by arrow 1705 from the X-axis 1535 to a Y-axis 1530. As should be appreciated, the angle between the Y-axis 1530 and the X-axis 1535 defines an angle 1605. Thus, rotating the clip 125 from the X-axis 1535 (unlocked position) to the Y-axis 1530 (locked position) locks the tabs 1417 behind the protrusion 1525 and against the inner surface of the seat support 407. In the locked position, the clip 125 is oriented along the Y-axis 1530 of the angle 1605. In one specific example, the clip 125 is rotated counterclockwise 90 degrees and/or a quarter of a turn counterclockwise via the grip fin 705 to lock the clip 125 within the opening 505. However, in other examples, the clip 125 is rotated less than 90 degrees. In yet another example, the clip 125 is rotated more than 90 degrees, but less than 360 degrees.

The lugs 1402 serve as stops and/or guides for rotation of the clip 125. For example, the protrusion 1525 is configured to abut the first lug 1405 and rest within the recessed portion 1415 prior to rotation of the clip 125 in an unlocked position. The clip 125 is rotated so that the protrusion 1525 abuts and/or contacts the second lug 1410, which is configured as approximately degrees in the locked position. As should be appreciated, rotation of the clip 125 separates the alignment of the tabs 1417 and the notches 1512, thus the clip 125 is unable to be removed from the opening 505 without rotation of the clip 125 back into the unlocked position.

To prevent accidental rotation and/or removal of the clip 125, the snap button 630 is configured to snap-fit within the aperture 510 once the clip 125 is rotated into the locked position (shown in FIG. 17). For example, once the protrusion 1525 abuts the second lug 1410 the snap button 630 snaps within the aperture 510 to prevent accidental rotation of the clip 125. As should be appreciated, the clip 125 is removed by lifting upwards and/or disengaging the snap button 630 from the aperture 510 and rotating the clip 125 90 degrees counterclockwise to align the tabs 1417 with the notches 1512. The clip 125 is then able to be lifted out of the opening 505.

The clip 125 is configured to secure within the opening 505 without tools and/or other fasteners. Put differently, the clip 125 enables toolless assembly of the seat assembly 100. Thus, saving time and preventing unwanted failures due to the improper use of fasteners and/or tools.

Figure 18:
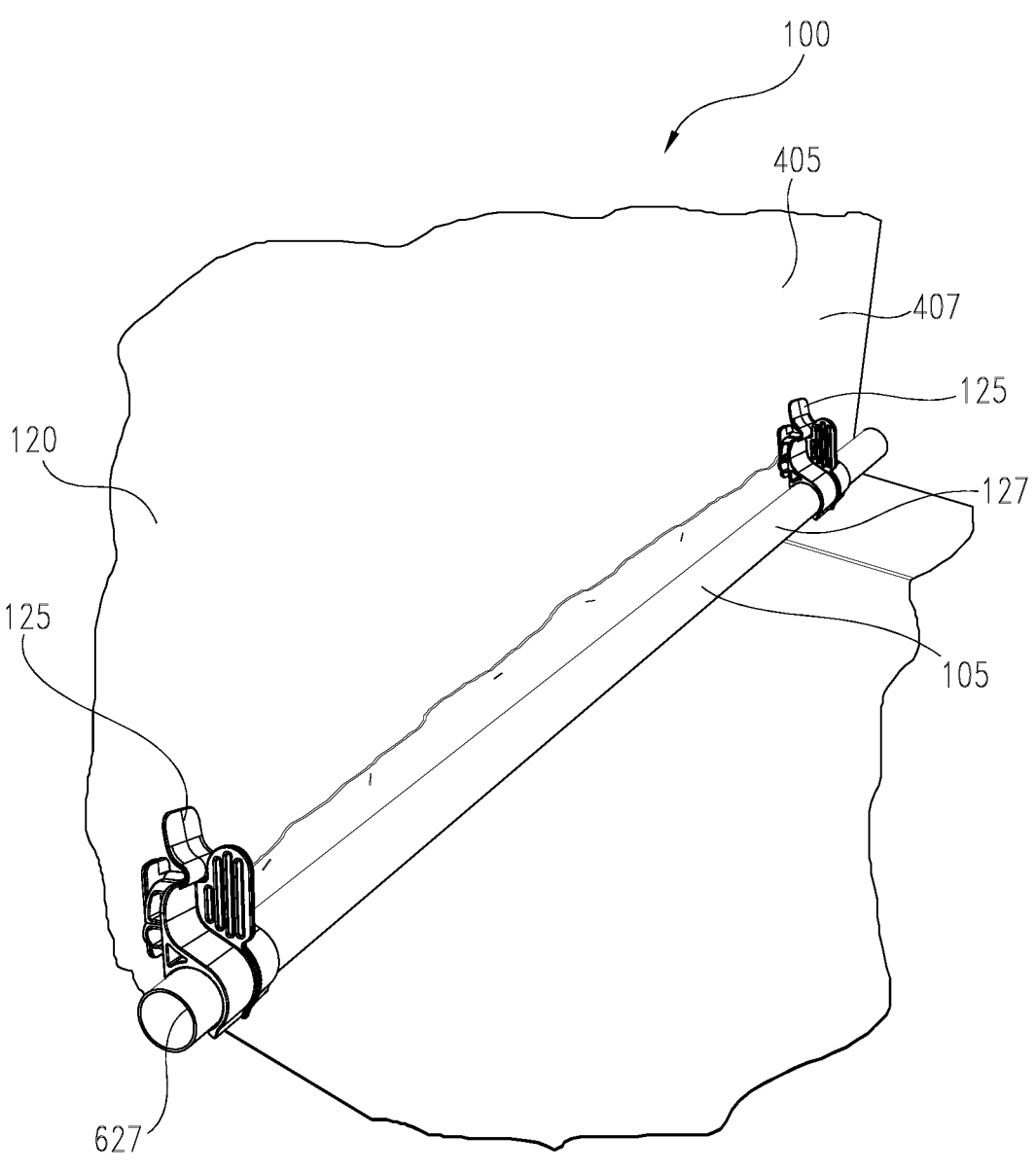
FIG. 18 is a perspective view of the seat of FIG. 4 mounted on a crossbar of a frame.

FIG. 18 shown an example of the seat assembly 100. As can be seen, the clips 125 are configured to clamp and/or retain the crossbar 127 in order to enable attachment of the seat 120 to the frame 105. As should be appreciated, the attachment of the seat 120 to the frame 105 via the one or more clips 125 is toolless. Put differently, a user is able to mount the seat 120 to the frame 105 without the use of tools and/or fasteners. Thus, the seat assembly 100 is reliable and inexpensive to manufacture.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"Acute" or "Acute Angle" generally refers to an angle smaller than a right angle or less than 90 degrees.

"Adhesive" generally refers to any non-metallic substance applied to one or both surfaces of two separate parts that binds them together and resists their separation. For example, an adhesive can bond both mating surfaces through specific adhesion (e.g., molecular attraction), through mechanical anchoring (e.g., by flowing into holes in porous surfaces), and/or through fusion (e.g., partial solution of both surfaces in the adhesive or its solvent vehicle). Some non-limiting examples of adhesives include liquid adhesives, film adhesives, resin adhesives, rubber adhesives, silicone-based adhesives, mastics, metal-to-metal adhesives, plastic adhesives, rubber adhesives, sprayable adhesives, and hot melt adhesives, to name just a few.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Cantilever Spring" generally refers to a spring fixed only at one end. In one non-limiting example, the cantilever spring is in the form of a flat spring that is anchored at one and the other end extends freely away from the anchored end.

"Cavity" generally refers to an empty space in a solid object. The cavity can be completely or partially surrounded by the solid object. For example, the cavity can be open to the surrounding environment.

"Channel" generally refers to a long, narrow groove in a surface of an object.

"Concave" generally refers to a surface that is hollowed or rounded inward in at least one dimension like the inside of a bowl or a groove.

"Detent" or "Detent Mechanism" generally refers to a device configured to position and hold one mechanical part in relation to another in a manner such that the device can be released by force applied to one of the parts. Some non-limiting examples of detents include a catch, dog, or spring-operated ball.

"Elastic" generally refers to a solid material and/or object that is capable of recovering size and/or shape after deformation. Elastic material typically is capable of being easily stretched, expanded, and/or otherwise deformed, and once the deforming force is removed, the elastic material returns to its original shape. By way of non-limiting examples, elastic materials include elastomers and shape memory materials. For instance, elastic materials can include rubber, both natural and synthetic, and plastics.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Female" generally refers to a structure that connects to another structure that includes hollow portions for receiving portions of a corresponding male connector.

"Flex Groove" generally refers to a narrow indentation or notch in an object that allows the object to bend at the notch.

"Frame" generally refers to a structure that forms part of an object and gives strength and/or shape to the object.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Isofix" or "ISOFIX" generally refers to an international standard for attachment points for child safety seats in passenger cars and other vehicles and/or attachment point or anchoring systems that satisfy the standard. More specifically, Isofix refers International Organization for Standardization (ISO) standard ISO 13216, which specifies the anchoring system for Group 1 child safety seats. This standard defines standard attachment points to be manufactured into cars, enabling compliant child safety seats to be quickly and safely secured. Isofix acts as an alternative to securing the seat with seat belts. In one form, child safety seats are secured with a single attachment at the top (e.g., top tether) and two attachments at the base of each side of the seat. The Isofix standard can be identified by other regional names. In the United States for example, the standard is commonly referred to as a LATCH ("Lower Anchors and Tethers for Children") system.

"Leaf Spring" generally refers to a type of spring made from one or more strips of elastic material. In one form, multiple strips of elastic material are laminated together to form the leaf spring, and in other forms, a single strip of elastic material, such metal and/or plastic, forms the leaf spring. The leaf springs can be curved or substantially straight. The leaf spring can further include a frame to which the ends of the strips are attached.

"Male" generally refers to a structure that connects to another structure that includes portions that fill or fit inside the hollow portion of a corresponding female connector.

"Manual" generally refers work done by human hand and not via machine, tool, and/or electronics.

"Notch" generally refers to an indentation, cut, groove, channel, and/or incision on an edge or surface. In some non-limiting examples, the notch includes a V-shaped or U-shaped indentation carved, scratched, etched, stamped, and/or otherwise formed in the edge or surface. The notch can have a uniform shape or a non-uniform shape.

"P-Clip" or "P-Clamp" generally refers to a strap or band forming a closed loop that is bent around to secure an object where the strap is bent to have an overall shape similar to the letter "P". The ends of the strap have fastener openings to which a screw or other fastener is secured to clamp the object within the closed loop. The P-Clip can be used for the permanent or semi-permanent fixing of cables, hoses, and pipes, to name just a few examples.

"Plastic" generally refers to a group of materials, either synthetic, semi-synthetic, and/or naturally occurring, that may be shaped when soft and then hardened to retain the given shape. Plastics are polymers. A polymer is a substance made of many repeating units. Plastics are generally insulators.

"Positive Lock" generally refers to a type fastening structure that is configured to remain secured even under vibratory or other loads.

"Rotate" generally refers to turning or movement about an axis and/or center. In some examples, the axis and/or center may be a fixed point. A more technical definition may include, to cause a plane region, line, and/or object to sweep out a volume or surface by moving around an axis so that each of its points remain at a constant distance from the axis. As an example, the earth rotates about a center axis. As another example, a pin joint allows movement via rotation about a single axis formed by the pin.

"Seat" generally refers to a type of support structure or a place constructed for the purpose of allowing a human and/or other animal to sit. Some examples of seats include chairs, stools, benches, saddles, and sofas to name just a few. Typically, but not always, the seat can further include a backrest, armrest, and a headrest as well as other features.

"Snap Fastener" generally refers to a fastening device including a male portion and a female portion. The male portion typically includes a protrusion or ball on one component, while the female portion typically includes a recess or a socket configured to accept and secure the male portion. Typically, a snap fastener is mated together by a pushing force and separated by a pulling force.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud, and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional, and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap fit connector, protruding edges of one part are pushed away from the target insertion area, and the other part then slides in between the protruding edges until a desired distance is reached. Once the desired distance is reached, the edges are then released such that the part is held in place.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic. The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

PART REFERENCE NUMBERS

100 seat assembly
105 frame

110 legs
115 mounting bracket
120 seat
125 clip
127 crossbar
130 latch plate
405 seat base
407 seat support
410 cushion
505 opening
510 aperture
605 body
610 clamp assembly
615 retention assembly
620 bearing
625 jaw
627 jaw opening
630 snap button
635 T-lock
637 ridge
640 cavities
645 channel
705 grip fin
710 gusset
805 ridges
1305 arcuate portion
1310 tongue
1315 flex groove
1400 lock assembly
1402 lugs
1405 first lug
1410 second lug
1415 recessed portion
1417 tabs
1420 first tab
1425 second tab
1505 sidewall
1510 slot
1512 notches
1515 first notch
1520 second notch
1525 protrusion
1530 Y-axis
1535 X-axis
1605 angle
1705 arrow

What is claimed is:

1. A system, comprising:
a seat component;
wherein the seat component includes a seat support;
wherein the seat support defines an opening;
a clip manually coupled to the seat component without fasteners;
wherein the clip has a bearing with one or more lugs extending from the bearing;
wherein the bearing extends through the opening in the seat support;
wherein the clip is configured to rotate from an unlocked position to a locked position;
wherein the lugs are coupled to the seat support in the locked position;
a frame including a crossbar;
wherein the clip has a jaw;
wherein the jaw is hook-shaped;
wherein the jaw defines a jaw opening;
wherein the jaw opening opens in a transverse direction relative to the bearing;

wherein the crossbar is inserted through the jaw opening during assembly;
wherein the jaw is resilient to bend as the crossbar is inserted through the jaw opening of the clip;
wherein the jaw is clipped to the crossbar;
wherein the crossbar is disposed between the jaw and the seat support when clipped; and
wherein the crossbar rests against the seat support when clipped.

2. The system of claim 1, wherein the opening is shaped to allow the lugs of the clip to be inserted into the opening at a single orientation.

3. The system of claim 2, wherein the seat support defines one or more notches configured to receive the lugs of the clip.

4. The system of claim 1, wherein the clip has a grab fin to facilitate rotation of the clip.

5. The system of claim 1, wherein the clip includes a detent to inhibit rotational movement of the clip.

6. The system of claim 5, wherein the seat support defines an aperture where the detent of the clip engages to inhibit the rotational movement of the clip.

7. The system of claim 6, wherein the detent includes a tongue with a button engaging the aperture in the seat support.

8. The system of claim 1, wherein:
the seat support defines an aperture;
the clip has a tongue with a button;
the tongue extends opposite to the jaw; and
the button is received in the aperture to inhibit rotational movement of the clip.

9. A system, comprising:
a frame;
a seat component including a seat support, wherein the seat support defines an opening; and
a clip having
a body,
a jaw extending from the body, wherein the jaw is hook-shaped, wherein the jaw defines a jaw opening, wherein the jaw is clipped to the frame, wherein the jaw is resilient to bend as the frame is inserted through the jaw opening of the clip,
a grab fin extending from the jaw,
one or more lugs extending from the body, wherein the lugs are configured to lock to the seat component,
wherein the clip is locked in the opening of the seat support via a rotational movement,
wherein the jaw extends in a parallel manner relative to the seat support when the clip is coupled to the seat support, and
wherein the grab fin extends from the jaw in a direction opposite to the jaw to brace the jaw.

10. The system of claim 9, wherein the clip includes a detent to inhibit rotational movement of the clip.

11. The system of claim 10, wherein the detent includes a tongue with a button.

12. The system of claim 9, wherein the lugs are positioned to allow the clip to be installed in a single orientation.

13. A method, comprising:
inserting one or more lugs of a clip into an opening of a seat support structure, wherein the lugs extend from a bearing of the clip, wherein the bearing is positioned in the opening of the seat support structure during the inserting, wherein the clip has a jaw, wherein the jaw is hook-shaped, wherein the jaw defines a jaw opening, wherein the jaw opening opens in a transverse direction relative to the bearing;

rotating the clip to lock the lugs to the seat support structure;

clipping the seat support structure to a crossbar of a frame by inserting the crossbar through the jaw opening of the clip, wherein the jaw is resilient to bend during the clipping wherein the crossbar is disposed between the jaw and the seat support structure as a result of the clipping; and pivoting the seat support structure via the clip to rest the seat support structure on the crossbar of the frame.

14. The method of claim 13, wherein said inserting includes orienting the lugs to an orientation corresponding to one or more notches around the opening of the seat support structure.

15. The method of claim 13, further comprising:

retaining the clip at a locked position by engaging a retention assembly of the clip with the seat support structure.

\* \* \* \* \*